United States Patent [19]

Walker et al.

[11] Patent Number: 4,935,979
[45] Date of Patent: Jun. 26, 1990

[54] DOCK LEVELER OPERATING APPARATUS

[75] Inventors: Edward T. Walker, Little Rock; Bobby A. Cook, Hot Springs, both of Ark.

[73] Assignee: Dock Leveler Manufacturing, Inc., Malvern, Ark.

[21] Appl. No.: 234,085

[22] Filed: Aug. 19, 1988

[51] Int. Cl.⁵ .................................................. E01D 1/00
[52] U.S. Cl. ...................................... 14/71.1; 14/71.3
[58] Field of Search ...................... 14/71.1, 71.3, 69.5

[56] References Cited

U.S. PATENT DOCUMENTS

| | | | |
|---|---|---|---|
| 3,327,335 | 6/1967 | Beckwith et al. | 14/71.3 |
| 3,409,922 | 11/1968 | Beckwith et al. | 14/71.3 |
| 3,460,175 | 8/1969 | Beckwith et al. | 14/71.3 |
| 3,486,181 | 12/1969 | Hecker et al. | 14/71.3 |
| 3,553,756 | 1/1971 | Hecker, Jr. et al. | 14/71.3 |
| 3,583,014 | 6/1971 | Brown et al. | 14/71.3 |
| 3,584,324 | 6/1971 | Merrick | 14/71.3 |
| 3,628,209 | 12/1971 | Parent | 14/71.1 |
| 3,636,578 | 1/1972 | Dieter | 14/71.3 |
| 3,685,077 | 8/1972 | Wiener et al. | 14/71.3 |
| 3,933,256 | 1/1976 | Fagerlund | 14/71.1 |
| 3,974,537 | 8/1976 | Ellis et al. | 14/71.3 |
| 4,010,505 | 3/1977 | Bouman | 14/71.3 |
| 4,065,824 | 1/1978 | Ellis et al. | 14/71.3 |
| 4,257,137 | 3/1981 | Hipp et al. | 14/71.3 |
| 4,325,155 | 4/1982 | Alten | 14/71.1 |
| 4,665,579 | 5/1987 | Bennett et al. | 14/71.1 |
| 4,689,846 | 9/1987 | Sherrod | 14/71.3 |

Primary Examiner—Stephen J. Novosad
Assistant Examiner—Matthew Smith
Attorney, Agent, or Firm—Finnegan, Henderson, Farabow, Garrett & Dunner

[57] ABSTRACT

An apparatus for operating a dock leveler including a lever adapted to be pivotably connected to the center plate for pivoting the center plate to the rearward position upon movement in a rearward direction to a first position. A lip extension apparatus is adapted to be connected to the lip plate and the base plate. The lip extension apparatus is operative for selectively pivoting the lip plate either toward the bridging position or to the stored position in response to forward movement of the lever at times when the center plate is in the rearward position. The lip extension apparatus includes an extension member and an extension stop member. A cocking apparatus is utilized to engage the extension member on the extension stop member for pivoting the lip plate toward the bridging position as the center plate pivots forwardly from the rearward position.

24 Claims, 13 Drawing Sheets

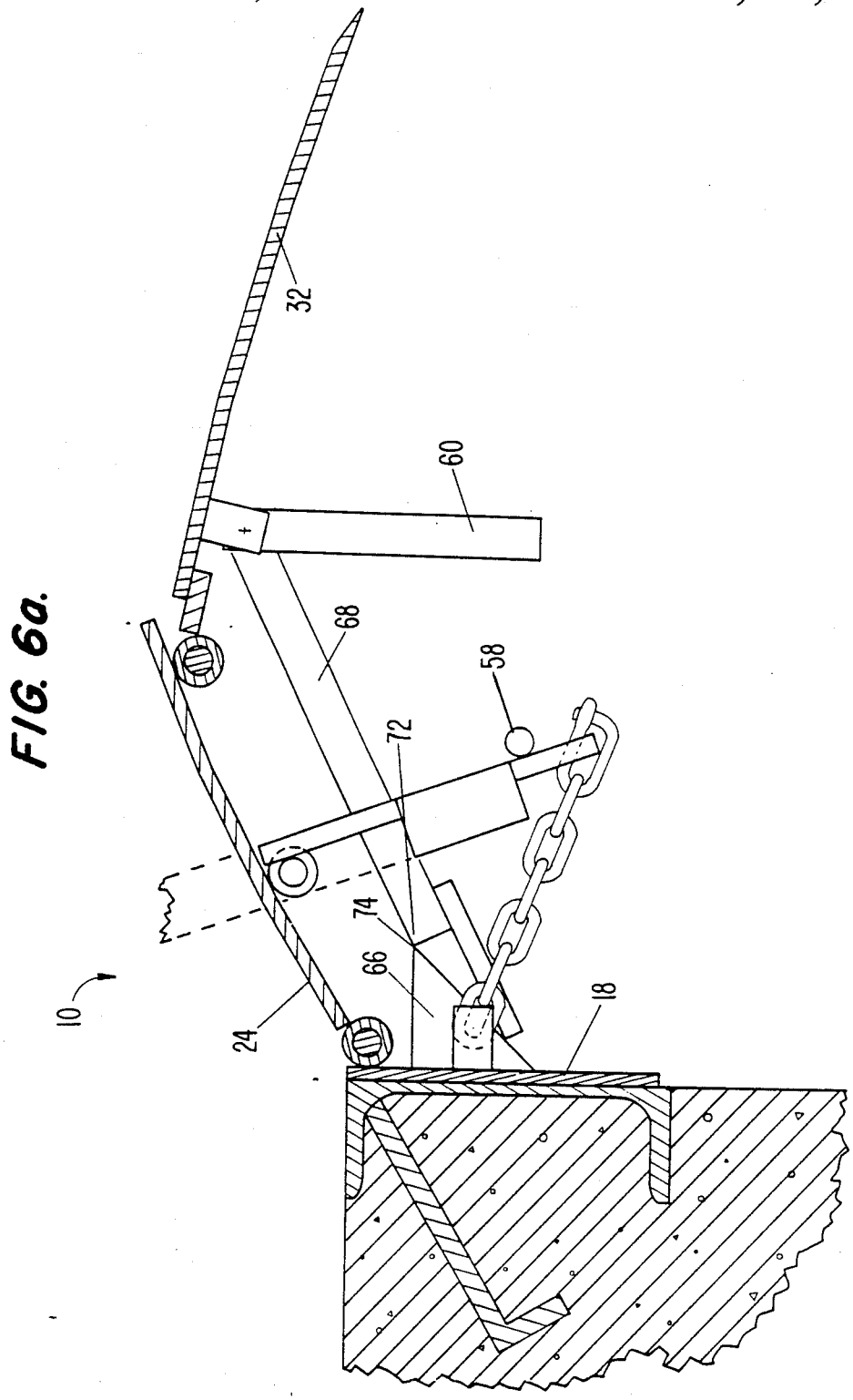

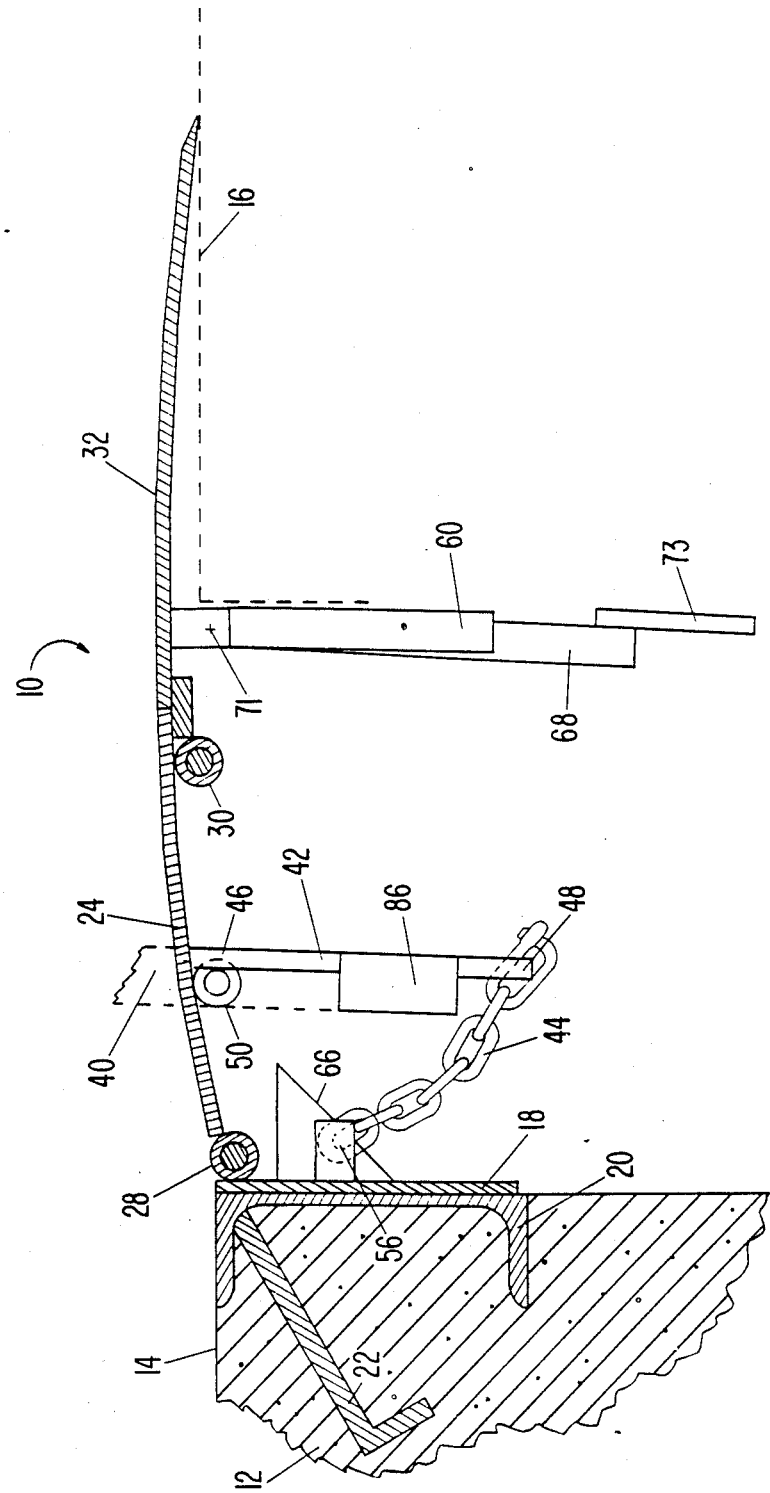

DOCK LEVELER OPERATING APPARATUS

BACKGROUND OF THE INVENTION

1. Field of the Invention

This invention relates to an edge of dock leveler which acts as a bridge between a loading dock platform and the bed of a carrier and, more particularly, to an apparatus for operating an edge of dock leveler for positioning the dock leveler at selected positions relative to an adjacent loading dock platform. Additionally, this invention relates to a method of operating the apparatus.

2. Description of Related Art

Dock levelers for bridging a gap between a loading dock platform and a carrier bed are in widespread use for facilitating the loading and unloading of various types of carriers. Forklift trucks are often required to move from a loading dock directly into and out of the storage compartment of a carrier. In order to facilitate such an operation, dock levelers are used to compensate for any height variation which exists between a loading dock platform and the bed of a carrier.

Typically, an edge of dock leveler will have a center plate which pivots relative to an adjacent loading dock platform and a lip plate which pivots relative to the center plate. The lip plate will rest directly on the bed of a carrier when the dock leveler is positioned as a bridge. The manual effort required to pivot the center plate and lip plate is often reduced due to the use of counterbalance spring mechanisms which are employed to assist in positioning the plates. For example, U.S. Pat. No. 4,665,579 discloses a counterbalancing mechanism for an edge of dock leveler.

These counterbalancing mechanisms often do not provide sufficient force to assist an operator attempting to manually position the center and lip plates of a dock leveler. Accordingly, a large amount of strain is placed on an operator attempting to manually position the center and lip plates. This strain can result in back injuries to operators.

To prevent an operator from injuring his back and to eliminate the lifting effort required to position the dock leveler, a prior art system has been developed that does not require an operator to actually lift the center or lip plates. Instead, an apparatus is utilized so that an operator can position a dock leveler with a push/pull motion. Such an apparatus is disclosed in U.S. Pat. No. 4,689,846.

Several problems are created by the use of a push/pull apparatus to position the dock leveler because a dock leveler is designed to accommodate carrier beds of different heights. Typically, a dock leveler will have a service range from 5 inches above dock height to 5 inches below dock height. The currently available push/pull apparatus used on a dock leveler does not allow a dock leveler to be extended into a carrier which has a bed height in the top of the leveler service range, i.e., 5 inches above dock height, without giving up the industry standard of having 12 inches of the lip plate engaged on the carrier bed when the leveler is in the bridging position.

A second problem associated with currently available push/pull apparatuses is the inability to place and end load on a carrier bed without having to move the carrier to permit the leveler to move from its bridging position to its stored position. When a dock leveler is in its bridging position, approximately 12 inches of the lip plate are engaged on the carrier bed. An end load cannot be placed on the carrier while the lip plate is in this position. To fill the carrier to 100% capacity, the dock leveler is moved from its bridging position to its stored position where its lip plate will not be engaged on the carrier bed, but rather will hang in a pendant position relative to the center plate. A forklift can then move over the center plate and place an end load into the carrier.

The ability to place an end load into all loaded carriers is essential for trucking companies to operate profitably. Typically, truck lines operate on a low margin and the inability to efficiently place an end load in all trucks can make the difference between making a profit or a loss. For example, if an end load cannot be placed in a 40 foot truck and there are 4 feet at the end of the truck bed which are not utilized for carrying cargo, 10% of the truck's capacity is wasted.

The problem with currently available push/pull apparatuses such as that disclosed in U.S. Pat. No. 4,689,846 is that the apparatus is operative for extending the lip any time the center plate is pivoted to its rearward position. When an operator desires to recycle the dock leveler, i.e., move the leveler from its bridging to its stored position, to enable an end load to be placed in the truck, the center plate is pulled back to its rearward position and then pushed forward in an attempt to place the leveler in its stored position. When the truck is in the high end of the leveler's service range, the apparatus will continually extend the lip into the truck while the operator is attempting to recycle the leveler to its stored position. This prevents the leveler from moving to its stored position until the truck is moved away from the loading dock. Once the leveler reaches its stored position, the truck can be moved back to its initial position so that an end load can be placed on its bed. In a busy environment such as a loading dock, this procedure results in a time delay reducing the volume of material which can be loaded in a day and has a direct negative impact on profitability of the shipping operation.

SUMMARY OF THE INVENTION

Accordingly, it is a primary object of this invention to provide a push/pull apparatus for operating a dock leveler which enables the leveler to be recycled out of the highest truck in its service range without having to move the truck.

It is a further object of this invention to provide a push/pull apparatus for operating a dock leveler which enables the dock leveler to be cycled, i.e., moved from its stored to its bridging position, into the highest extent of its service range.

It is still a further object of this invention to provide an apparatus for operating a dock leveler which enables a truck to be efficiently loaded to 100% capacity.

To achieve the foregoing objects in accordance with the purpose of the invention as embodied and broadly described herein, the dock leveler of this invention comprises a base plate to be attached to the loading dock. A center plate is provided having a first edge pivotably connected to the base plate for pivotal movement in rearward and forward directions between a rearward position and a forward position. A lip plate is further provided having a first edge pivotably connected to a second edge of the center plate for pivotal movement between a retracted position in which the lip plate forms an acute angle with the center plate, a stored position in which the lip plate forms a substantially right angle with the center plate and a bridging position in which the lip plate is substantially co-planar with and forms an extension of the center plate. Additionally, lever means are pivotably connected to the center plate. The lever means pivots the center plate to the rearward position upon movement in the rearward direction to a first position. During the pivoting of the center plate to the rearward position, the lip plate pivots to the retracted position. Lip extension means are further provided. The lip extension means selectively pivot the lip plate either toward the bridging position or to the stored position in response to forward movement of the lever means at times when the center plate is in the rearward position. The forward movement of the lever means pivots the center plate toward the forward position.

Preferably, the lever means comprises an elongated member, a manually operated lever and a connecting member for limiting the pivotal movement of the lever and the elongated member. Preferably, the lip extension means includes an extension stop member disposed on the base plate and an extension member pivotably connected to the lip plate with a free end engaged with the extension stop member at times when the lip plate is selected to pivot toward the bridging position.

In another aspect of the invention, an apparatus for operating a dock leveler of the type just described is provided. The apparatus comprises lever means adapted to be pivotably connected to the center plate for pivoting the center plate to the rearward position upon movement in a rearward direction to a first position. During the pivoting of the center plate to the rearward position, the lip plate pivots to the retracted position. Lip extension means are adapted to be connected to the lip plate and base plate. The lip extension means selectively pivot the lip plate either toward the bridging position or to the stored position in response to forward movement of the lever means at times when the center plate is in the rearward position. The forward movement of the lever means pivots the center plate toward the forward position.

In yet another aspect of the present invention, a method of operating a dock leveler of the type just described is provided. The method includes the step of first, rearwardly pivoting the lever means to a first position to cause the center plate to pivot to the rearward position while permitting the lip plate to pivot to the retracted position. Second, the lever means is pivoted from the first position in the forward direction to a second position while maintaining the center plate in the rearward position. Third, the lever means is pivoted from the second position in the rearward direction to the first position while maintaining the center plate in the rearward position for engaging the extension member on the extension stop member. Fourth, the lever means is pivoted from the first position in the forward direction causing the center plate to pivot from the rearward position in the forward direction and for causing the lip plate to pivot toward the bridging position.

Preferably, the method of the present invention further includes the step of permitting the extension member to disengage from the extension stop member when the center plate is at a predetermined pivotal position. The disengagement of the extension member from the extension stop member preferably creates a sear action.

The accompanying drawings, which are incorporated in and constitute a part of this specification, illustrate one embodiment of the invention and together with the description serve to explain the principles of this invention.

BRIEF DESCRIPTION OF THE DRAWINGS

FIG. 3 (b) is a perspective view illustrating the position of the operating apparatus of the present invention when the dock leveler is in the position shown in FIG. 3 (a);

FIG. 4 (b) is a perspective view illustrating the position of the operating apparatus of the present invention when the dock leveler is in the position shown in FIG. 4(a);

FIG. 5 (b) is a perspective view illustrating the position of the operating apparatus of the present invention when the dock leveler is in the position shown in FIG. 5 (a);

FIG. 6 (b) is a perspective view illustrating the position of the operating apparatus of the present invention when the dock leveler is in the position shown in FIG. 6 (a);

FIG. 7 is a sectional side view illustrating the dock leveler shown in FIG. 1 in a bridging position;

DESCRIPTION OF THE PREFERRED EMBODIMENTS

Figure 1:
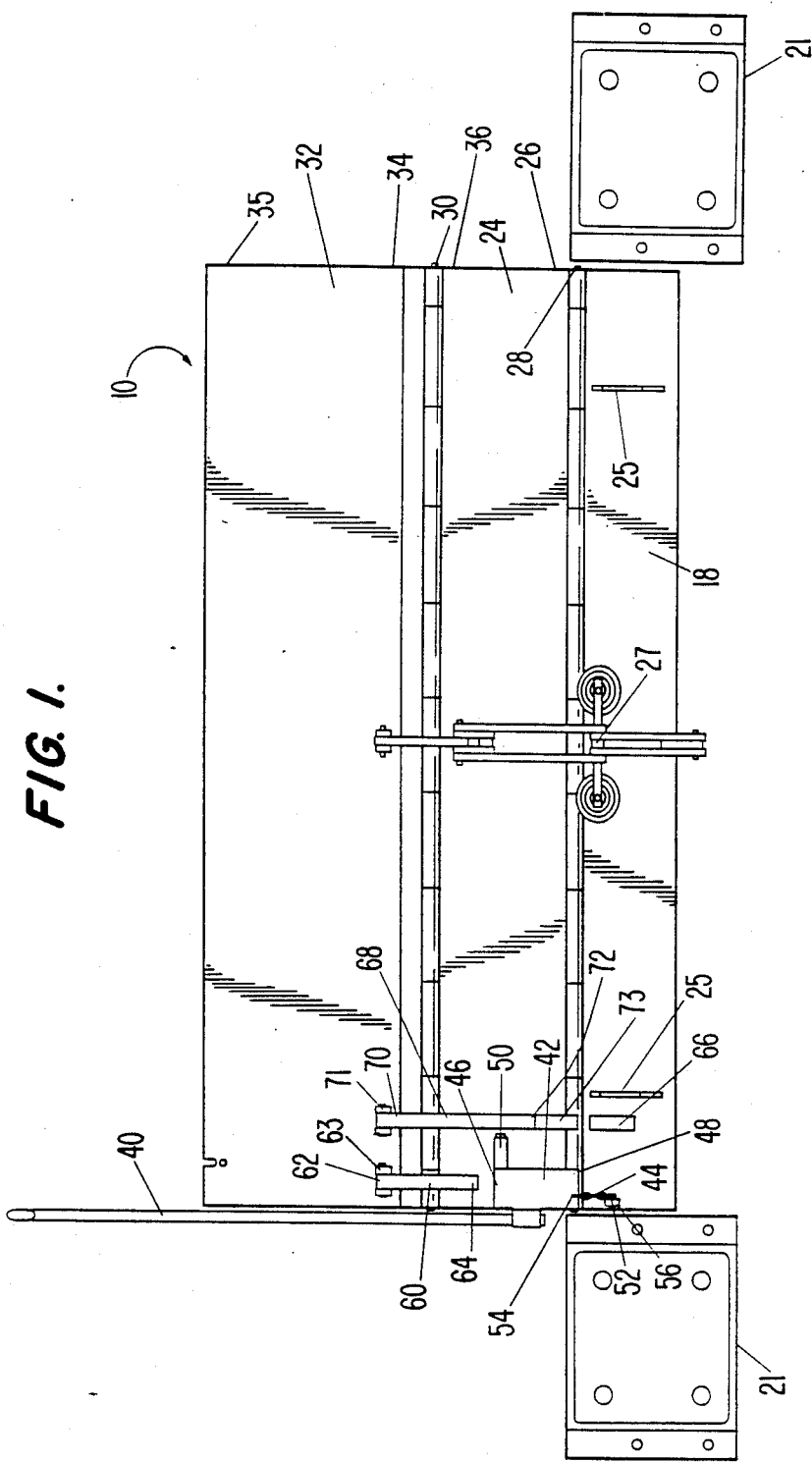
FIG. 1 is a front plan view of a dock leveler made in accordance with the present invention in a full upright position.

The preferred embodiment of the dock leveler of the present invention is shown in FIGS. 1-7 and is represented generally by the numeral 10. Referring now to FIG. 7, it can be seen that dock leveler 10 is adapted to be located on the edge of loading dock 12 to bridge the gap between loading dock platform 14 and carrier bed 16 (shown in dotted lines).

In accordance with the present invention, the dock leveler includes a base plate to be attached to the loading dock. As embodied herein, dock leveler 10 includes base plate 18 to be attached to loading dock 12. Base plate 18 is secured to loading dock 12 by dock edge channel iron 20 and anchor 22. Loading dock 12 is typically of concrete construction and dock edge channel iron 20 and anchor 22 are typically embedded in the concrete structure. It is also possible to make base plate 18 integral with dock edge channel iron 20 by using the face of channel iron 20 as the base plate. Bumper blocks 21 (shown only in FIG. 1) are positioned on both sides of base plate 18 to stop trucks for backing into loading dock 12.

In accordance with the present invention, the dock leveler includes a center plate having first and second opposite edges. The first edge is pivotably connected to the base plate for pivotal movement in rearward and forward directions between a rearward position and a forward position. As embodied herein, dock leveler 10 includes center plate 24 having a substantially planar upper surface over which a forklift truck or the like may move during unloading or loading of carrier bed 16. A first edge 26 of center plate 24 is pivotably connected to base plate 18 by hinge 28 allowing center plate 24 to pivot about hinge 28 between a rearward position illustrated in FIG. 3 (a) and a forward position illustrated in FIG. 2. Center plate 24 includes a second edge 36 which is preferably parallel to first edge 26. When center plate 24 is in the forward position it is supported by support gussets 25 which are connected to base plate 18. Support gussets 25 have been omitted from certain figures for clarity.

In accordance with the present invention, the dock leveler includes a lip plate having first and second opposite edges. The first edge of the lip plate is pivotably connected to the second edge of the center plate for pivotal movement between a retracted position in which the lip plate forms an acute angle with the center plate, a stored position in which the lip plate forms a substantially right angle with the center plate and a bridging position in which the lip plate is substantially coplanar with and forms an extension of the center plate. As embodied herein, and depicted in FIGS. 1 and 2, dock leveler 10 includes lip plate 32 which is pivotably connected at a first edge 34 to second edge 36 of center plate 24 by hinge 30. Lip plate 32 is adapted to move between a retracted position shown in FIG. 3 (a) in which the lip plate forms an acute angle 33 with the center plate, a stored position shown in FIG. 2 in which the lip plate forms a substantially right angle 38 with the center plate and a bridging position shown in FIG. 7 in which lip plate 32 is substantially coplanar with and forms an extension of center plate 24. As embodied herein, the substantially right angle 38 of lip plate 32 with center plate 24 is approximately 105° and the acute angle 33 of lip plate 32 with center plate 24 is approximately 60°. Lip plate 32 includes a second edge 35 which is preferably parallel to first edge 34.

Preferably a counterbalance spring mechanism 27 as shown in FIG. 1 is utilized to reduce the force required to pivot dock leveler 10. Counterbalance spring mechanism 27 exerts an upward force on center plate 24 and lip plate 32. Counterbalance spring mechanism 27 is a duel extension spring mechanism which is well known in the art. For example, such a mechanism is used on a dock leveler shown and described in U.S. Pat. No. 4,689,846 which is incorporated by reference in this specification. Accordingly, the details of counterbalance spring mechanism 27 will not be further described.

Further in accordance with the present invention, the dock leveler includes lever means pivotally connected to the center plate. The lever means pivots the center plate to the rearward position upon movement in the rearward direction to a first position. The lip plate pivots to the retracted position during the pivoting of the center plate to the rearward position.

As embodied herein, dock leveler 10 includes lever means pivotally connected to center plate 24. The lever means pivots center plate 24 to the rearward position shown in FIG. 3(a) upon movement in the rearward direction (indicated by arrow 84) to a first position shown in FIG. 3(a). Lip plate 32 pivots via gravity to the retracted position shown in FIG. 3(a) during the pivoting of center plate 24 to the rearward position. Preferably, the lever means includes manually operated lever 40, operating tube 86, elongated member 42 and connecting member 44. Elongated member 42 includes first and second spaced opposite ends 46 and 48, respectively. The first end 46 of elongated member 42 is pivotally connected to center plate 24 by pivot block 50.

Figure 3A:
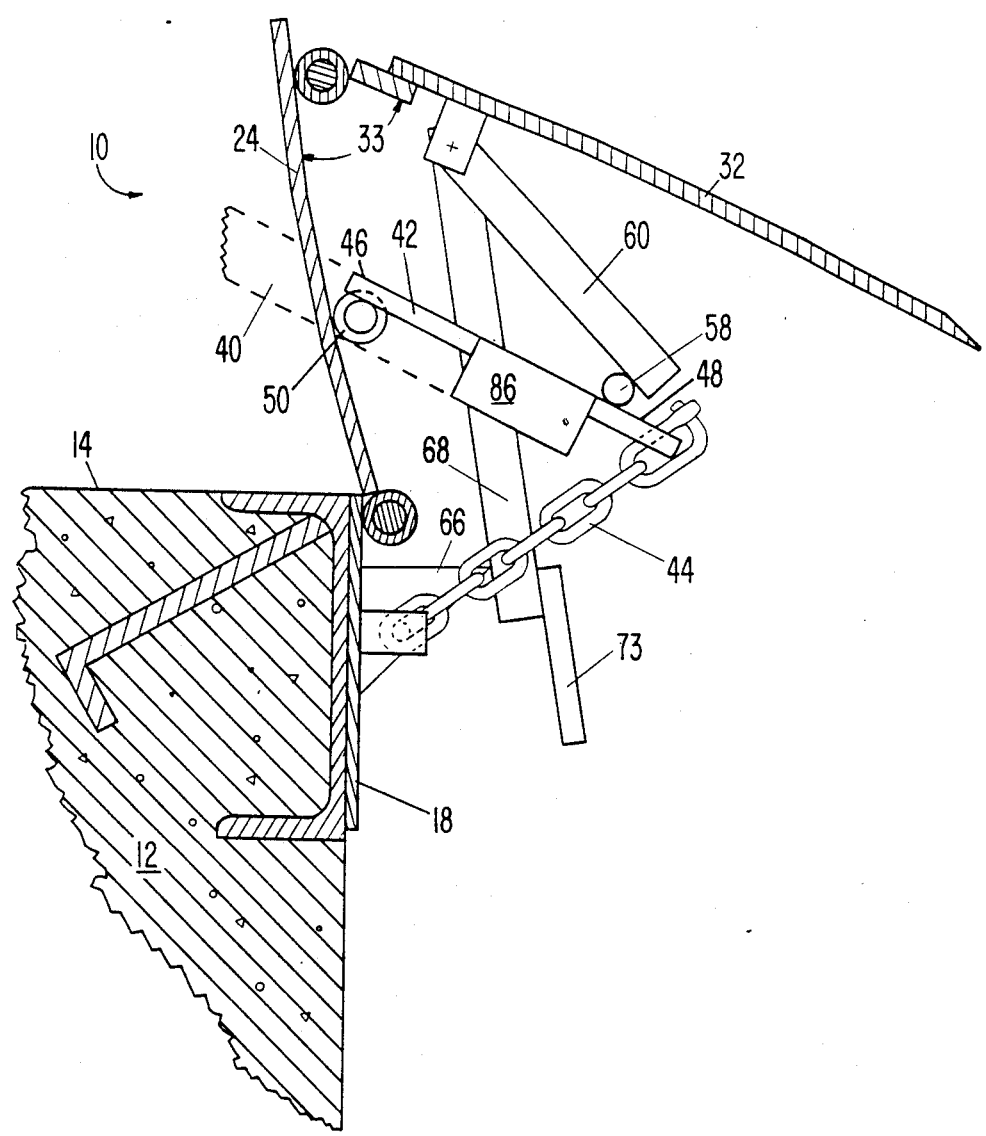
FIG. 3 (a) is a sectional side view illustrating the dock leveler shown in FIG. 1 when the center plate is in its rearward position and the lip plate is in its retracted position.
Figure 3B:
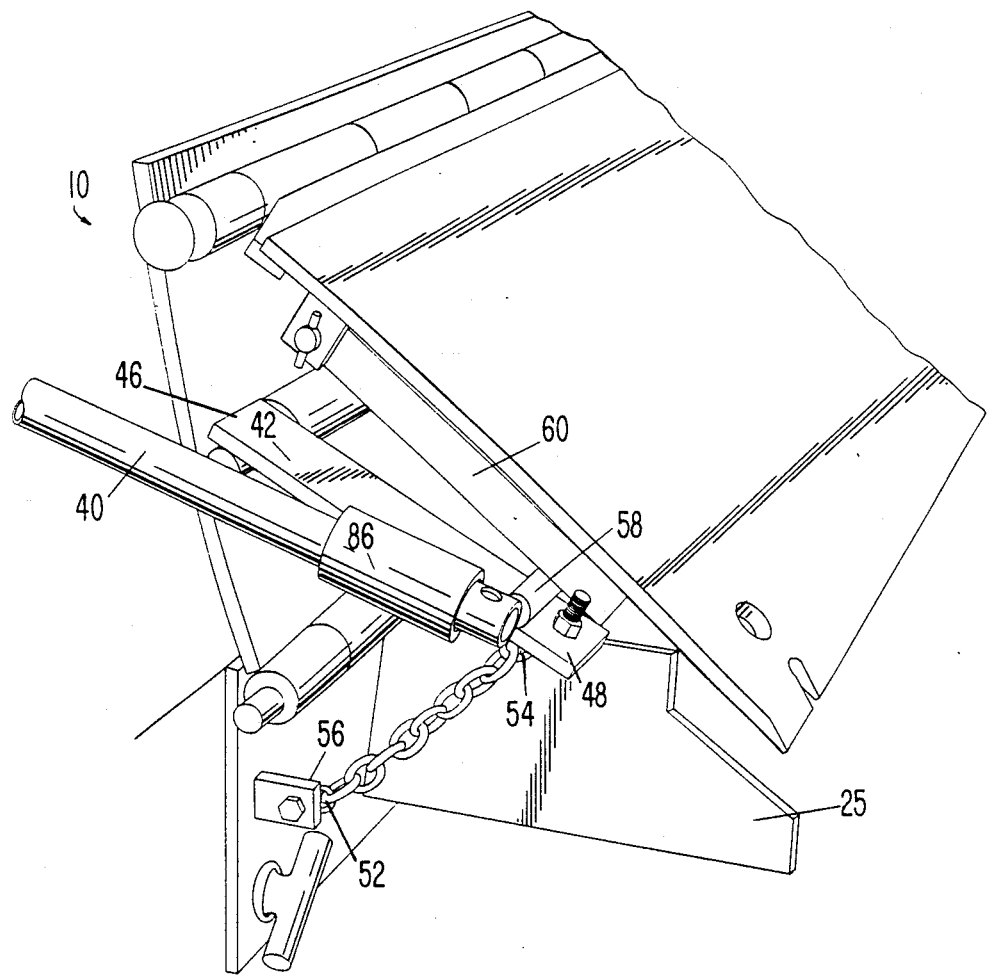

As can be seen in FIG. 3(b), operating tube 86 is fixedly secured to elongated member 42 intermediate its first and second ends, 46 and 48, respectively. Lever 40 may be removed from operating tube 86 when dock lever 10 is not in use. Alternatively, lever 40 may be captive in operating tube 86 and remain therein even when dock leveler 10 is not in use. In such a case, lever 40 will slide through operating tube 86 and a majority of lever 40 will be below the level of loading dock platform 14. A stop (not shown) on the upper end of lever 40 prevents the lever from completely sliding through operating tube 86.

Connecting member (embodied in FIGS. 1–7 as chain 44) includes first and second opposite ends 52 and 54, respectively. The first end 52 is pivotally connected to base plate 18 through pivot block 56 and the second end 54 is connected to the second end 48 of elongated member 42 for limiting the pivotal movement of lever 40 and elongated member 42. Elongated member 42 and connecting member 44 are operative to pivot center plate 24 to the rearward position upon movement of lever 40 in the rearward direction to a first position. The rearward position of center plate 24 and the first position of lever 40 are illustrated in FIG. 3(a).

Figure 8:
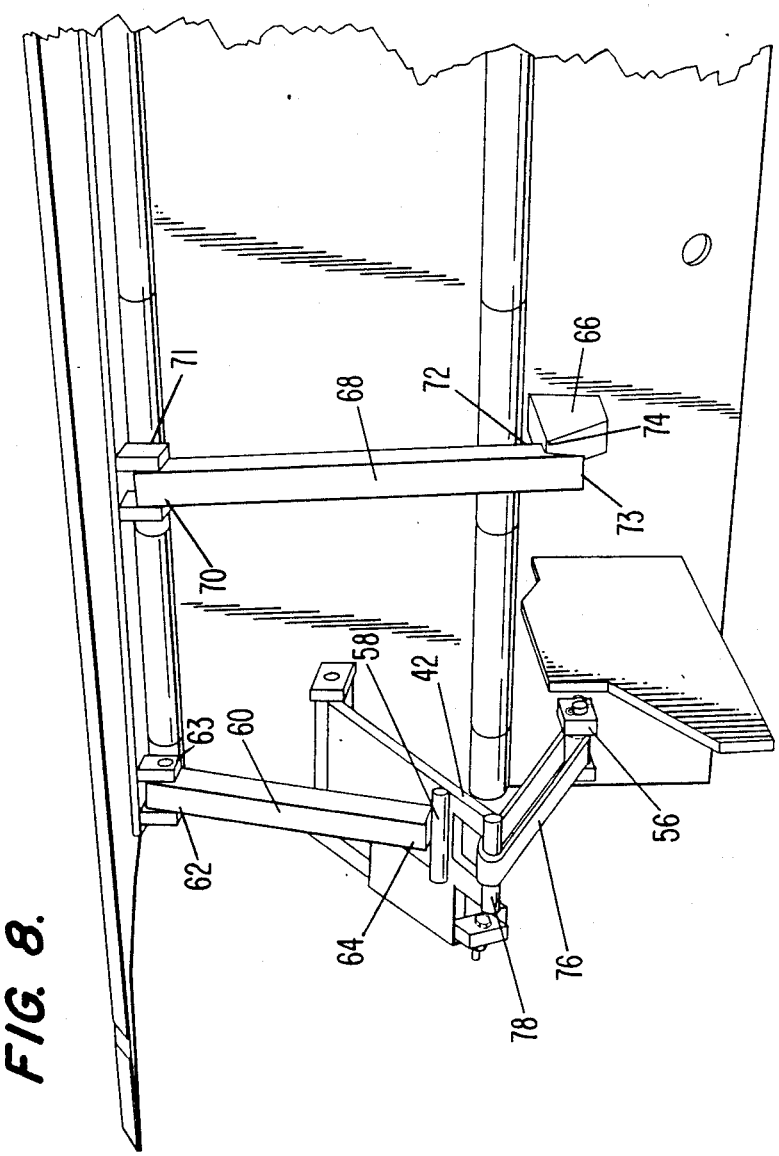
FIG. 8 is a perspective view illustrating a second embodiment of the operating apparatus of the present invention.
Figure 9:
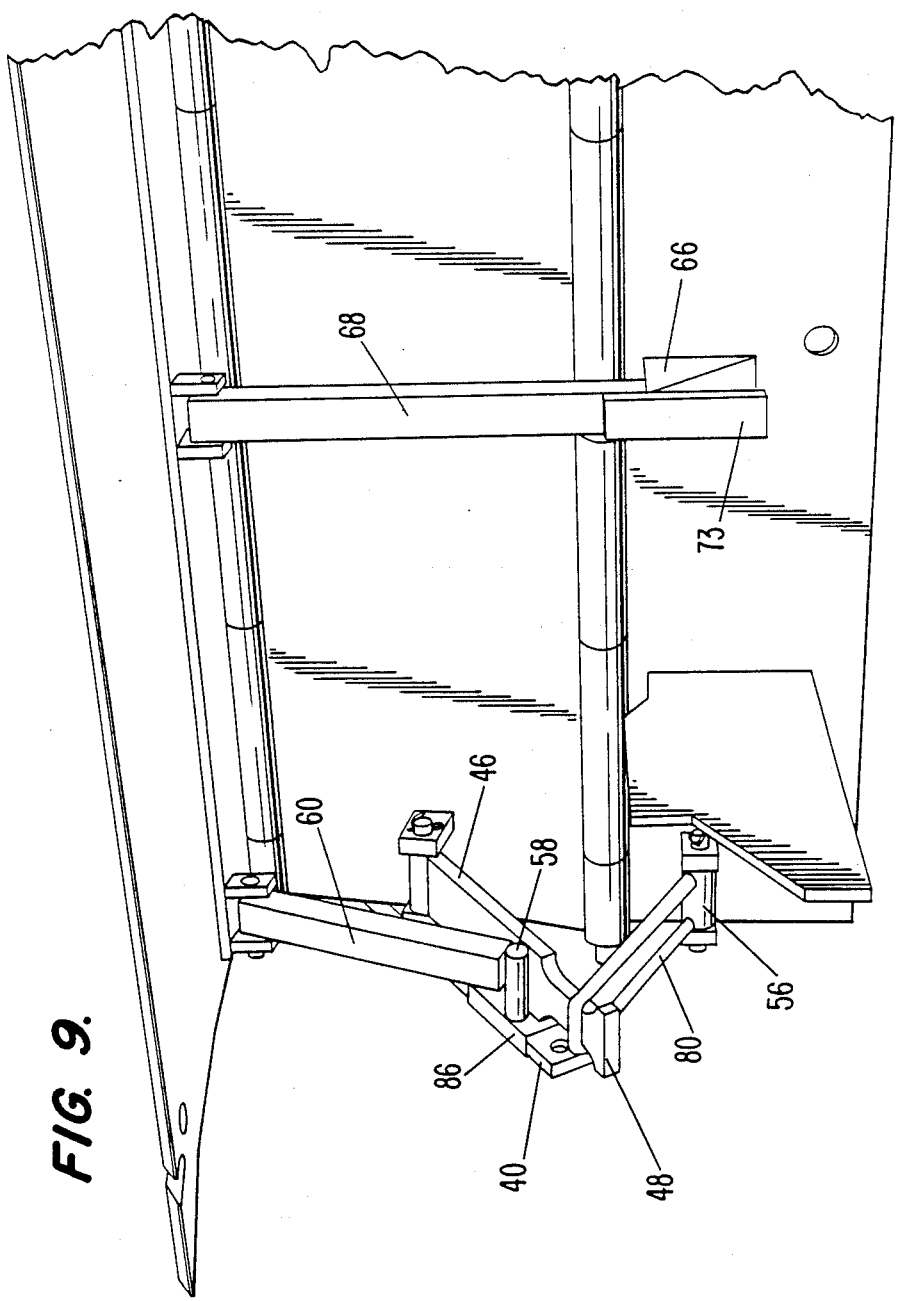
FIG. 9 is a perspective view illustrating a third embodiment of the operating apparatus of the present invention.

As shown in FIGS. 1–7, the connecting member comprises a chain 44. Alternatively, a cable or wire rope can be used as the connecting member. Other, alternate embodiments of the connecting member are illustrated in FIGS. 8 and 9. With reference to FIG. 8, the connecting member comprises a closed loop 76 and elongated member 42 includes means slidably engaged in loop 76. The means slidably engaged in loop 76 includes rod 78 at the second end 48 of elongated member 42. With reference to FIG. 9, the connecting member comprises a U-shaped bar 80 dimensioned to slidably receive the second end 48 of elongated member 42. In both embodiments depicted in FIGS. 8 and 9 as well as the embodiment depicted in FIGS. 1–7, the connecting member is pivotally connected to base plate 18 through pivot block 56.

Figure 4B:
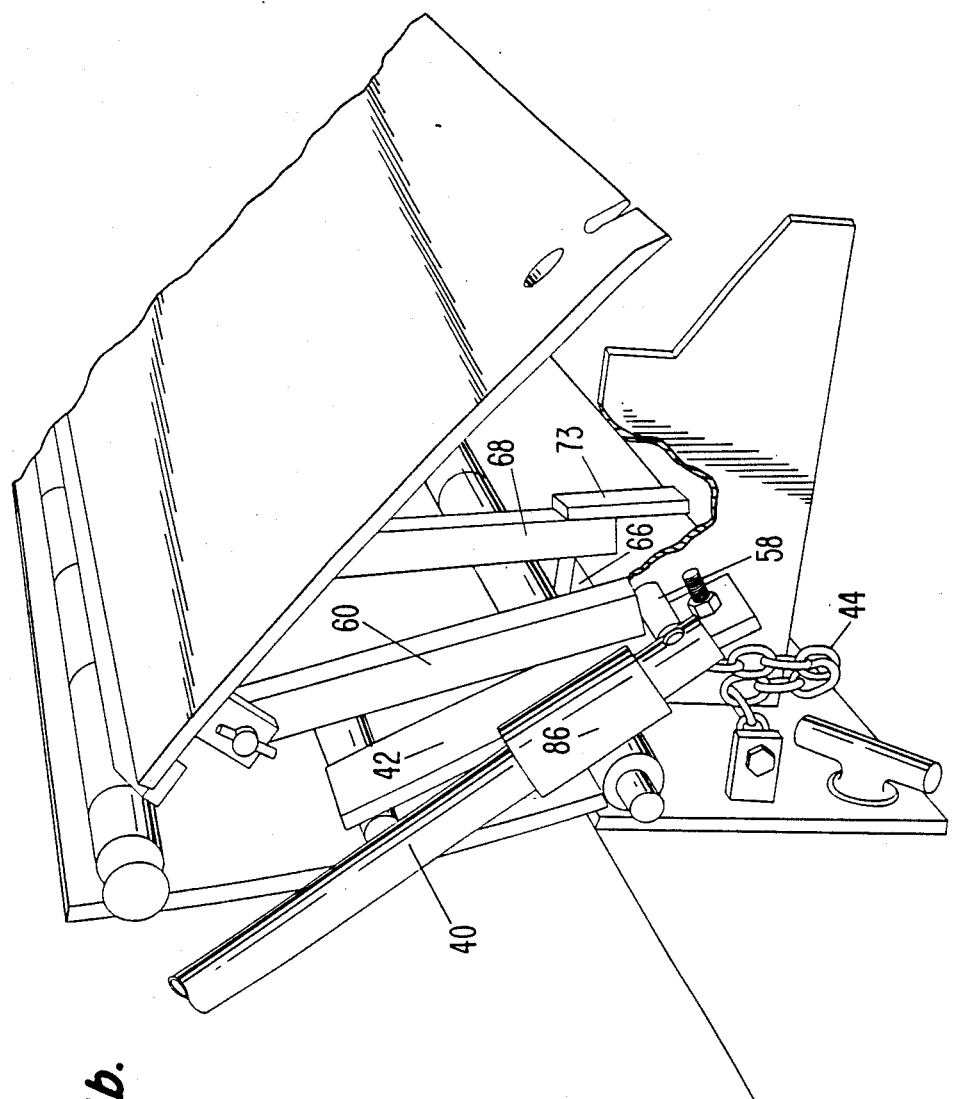
Figure 5A:
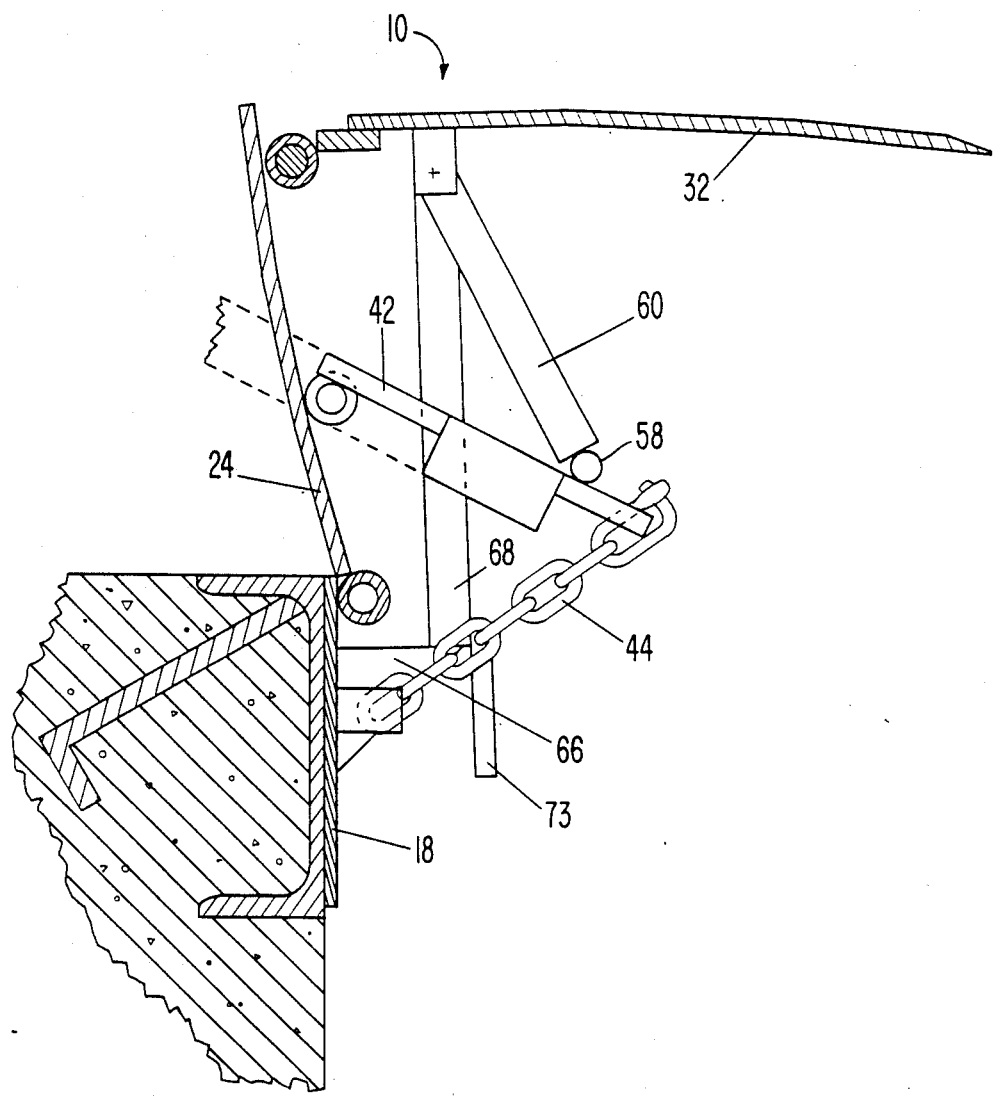
FIG. 5 (a) is a sectional side view illustrating the dock leveler shown in FIG. 1 when the lever has been rearwardly pivoted from the position shown in FIG. 4 (a)
Figure 5B:
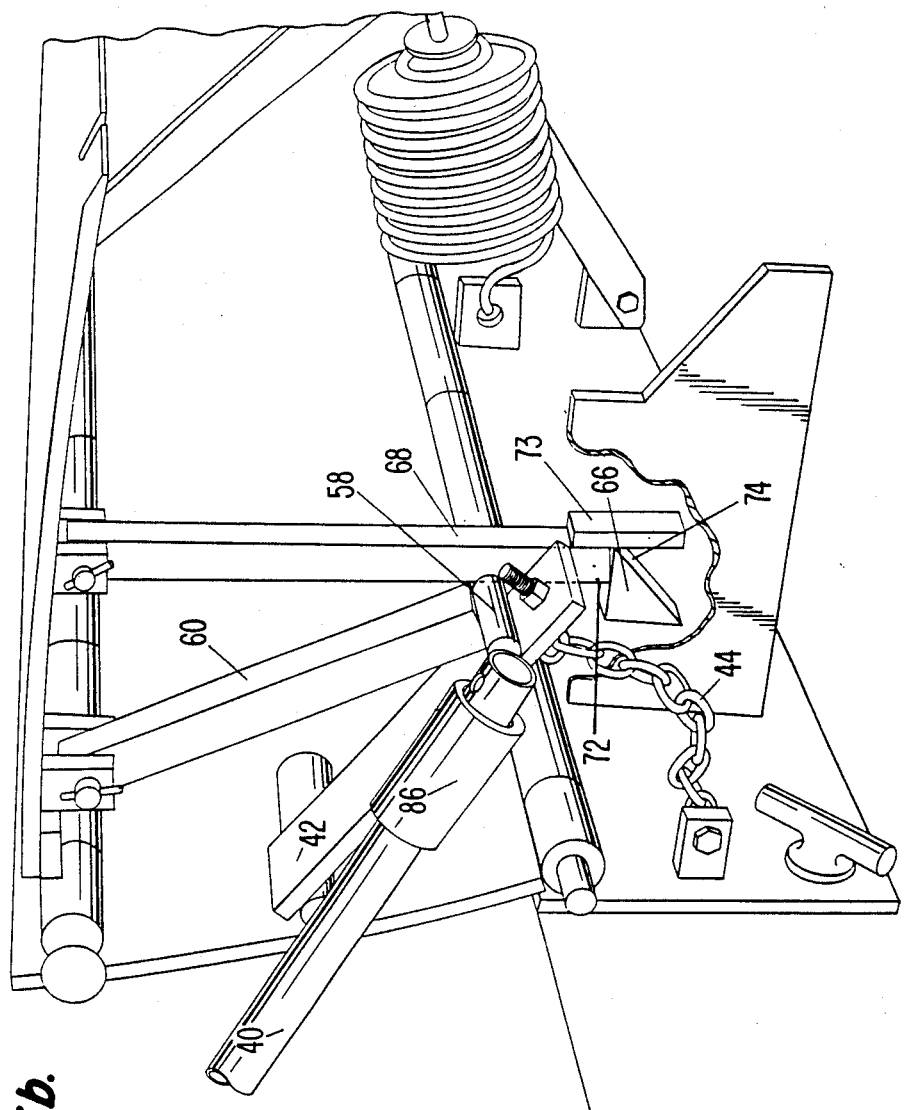
Figure 6B:
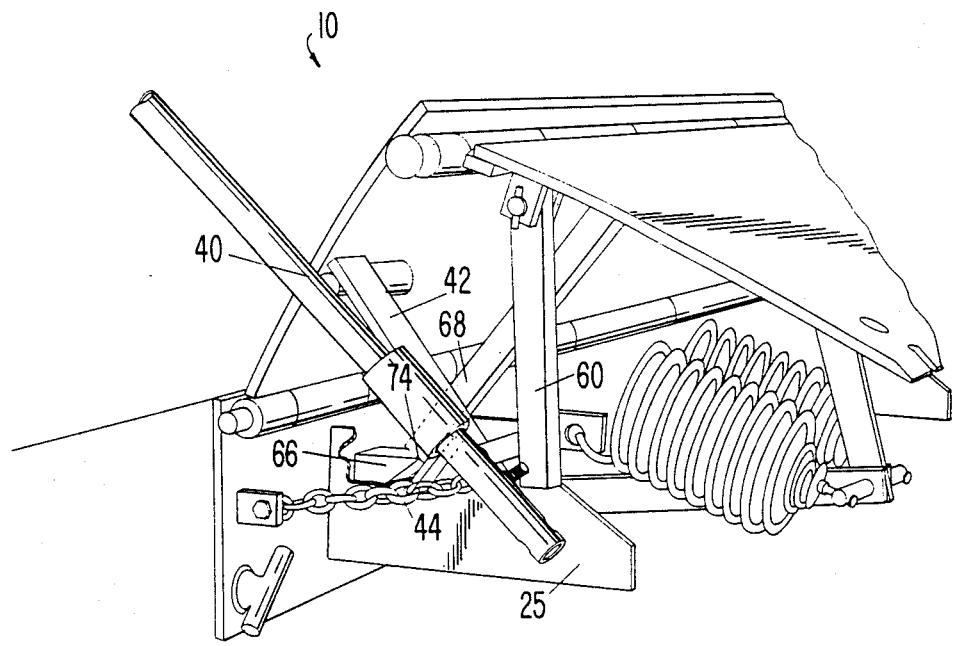
FIG. 6 (a) is a sectional side view of the dock leveler shown in FIG. 1 as the dock leveler moves from the position shown in FIG. 5(a) toward its bridging position.

In accordance with the present invention, the dock leveler includes lip extension means for selectively pivoting the lip plate either toward the bridging position or to the stored position in response to forward movement of the lever means at times when the center plate is in the rearward position. The forward movement of the lever means pivots the center plate toward the forward position. As embodied herein, and most clearly depicted in FIG. 8, the lip extension means includes an extension stop member 66 disposed on base plate 18 and an extension member 68 having a first end 70 pivotally connected by pivot block 71 to lip plate 32, a free second end 72, and bar 73. Free end 72 is engaged with extension stop member 66 at times when the lip plate is selected to pivot toward the bridging position. As shown in FIG. 5(b), bar 73 abuts extension stop member 66 to limit the rotation of extension member 68 in the clockwise direction and enable free end 72 of extension member 68 to engage stop member 66 end 72 is not engaged with extension stop member 66 at times when lip plate 32 is selected to pivot to the stored position. FIG. 4(b) illustrates the operating apparatus of the present invention when extension member 68 is not engaged with extension stop member 66 and FIG. 5(b) illustrates extension member 68 engaged on extension stop member 66.

Preferably, extension stop member 66 includes an angled portion 74 and extension member 68 disengages from angled portion 74 in a sear action when center plate 24 reaches a predetermined pivotal position.

Further in accordance with the present invention, the lip extension means includes cocking means attached to the lever means and the lip plate for engaging the free second end of the extension member on the extension stop member in response to a distinct movement of the lever means. As embodied herein, and most clearly depicted in FIG. 8, the cocking means includes a cocking stop member 58 disposed on elongated member 42 and a cocking arm 60 having a first end 62 pivotally connected by pivot block 63 to lip plate 32 and a free second end 64. Free end 64 of cocking arm 60 is operative in response to forward movement of lever 40 from the position shown in FIG. 3(a) to the position shown in FIG. 4(a) and back again to the position shown in FIG. 5(a) to engage cocking stop member 58 for engaging the free second end 72 of extension member 68 on extension stop member 66.

In yet another aspect of the present invention, there is provided a method of operating a dock leveler of the type previously described. This method of operation will be described with reference to the drawings which illustrate sequential movements of the dock leveler and operating apparatus of the present invention.

The method of the present invention includes two operations of the dock leveler, namely cycling and recycling. Cycling is the process of moving the dock leveler from its stored position (shown in FIG. 2) to its bridging position (shown in FIG. 7). Recycling is the process of moving the dock leveler from its bridging position to its stored position.

Figure 2:
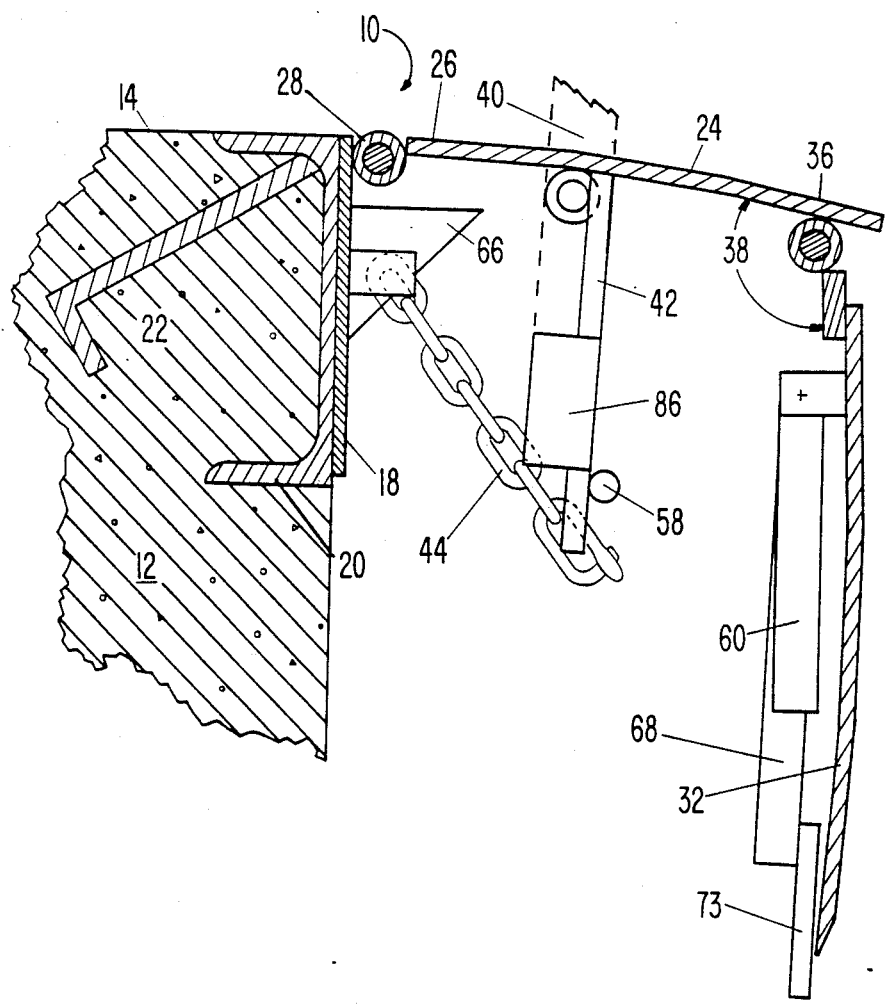
FIG. 2 is a sectional side view illustrating the dock leveler shown in FIG. 1 in a stored position.

FIG. 2 shows the dock leveler of the present invention in its stored position. In accordance with the method of the present invention, the first step of cycling the dock leveler includes rearwardly pivoting the lever means to a first position to cause the center plate to pivot to the rearward position while permitting the lip plate to pivot to the retracted position.

As embodied herein, the first step includes either inserting lever 40 in operating tube 86 (if removable) or raising lever 40 into operating position if it is captive in operating tube 86. The operator then pulls lever 40 in the rearward direction causing elongated member 42 to pivot counterclockwise about pivot block 50. When elongated member 42 has pivoted a predetermined distance, connecting member 44 restrains the pivotal movement of elongated member 42 and lever 40. This causes center plate 24 to pivot in a rearward direction (counterclockwise) to its rearward position upon further rearward movement of lever 40. During the pivoting of center plate 24 to the rearward position, lip plate 32 pivots via gravity to its retracted position to form acute angle 33 with center plate 24. Also during the pivoting of center plate 24 to its rearward position, cocking arm 60 and extension member 68 pivot via gravity in a clockwise direction about pivot points 63 and 71, respectively. Dock leveler 10 is in equilibrium due to the force applied by counterbalance spring mechanism 27. After the first step of the method of the present invention has been performed, dock leveler 10 is in the position illustrated in FIG. 3 (a) and the operating apparatus of the present invention is in the position illustrated in FIG. 3 (b).

In accordance with the method of the present invention, the second step of cycling the dock leveler includes pivoting the lever means from the first position in the forward direction to a second position while maintaining the center plate in the rearward position. As embodied herein, the second step includes pivoting lever 40 from the first position (shown in FIG. 3(a)) in the forward direction to a second position (shown in FIG. 4(a)) while maintaining center plate 24 in the rearward position. Elongated member 42 pivots clockwise about pivot block 50 and cocking arm 60 pivots clockwise about pivot block 63 as lever 40 is pivoted to the second position. Free second end 64 of cocking arm 60 rests on elongated member 42 directly above cocking stop member 58. After the second step of the present invention has been performed, dock leveler 10 is in the position shown in FIG. 4 (a) and the operating apparatus is in the position shown in FIG. 4 (b).

In accordance with the method of the present invention, the third step of cycling the dock leveler includes pivoting the lever means from the second position in the rearward direction to the first position while maintaining the center plate in the rearward position for engaging the extension member on the extension stop member. As embodied herein, the third step includes pivoting lever 40 from the second position in the rearward direction to the first position while maintaining center plate 24 in the rearward position for engaging the free second end 72 of extension member 68 on extension stop member 66. Elongated member 42 pivots counterclockwise about pivot block 50 as lever 40 is pivoted rearwardly to the first position. As elongated member 42 pivots, free second end 64 of cocking arm 60 engages cocking stop member 58. The engagement between cocking arm 60 and cocking stop member 58 causes lip plate 32 to pivot counterclockwise about hinge 30 for raising the second end 35 of lip plate 32 relative to loading dock platform 14. As lip plate 36 pivots counterclockwise, extension member 68 is moved and its free second end 72 becomes engaged on extension stop member 66. Lip plate 32 is now essentially parallel with the surface of loading dock 12 and dock leveler 10 is in equilibrium. After the third step of the method of the present invention has been performed, dock leveler 10 is in the position shown in FIG. 5 (a) and the operating apparatus is in the position shown in FIG. 5 (b).

In accordance with the method of the present invention, the fourth step of cycling the dock leveler includes pivoting the lever means from the first position in the forward direction causing the center plate to pivot from the rearward position in the forward direction and for causing the lip plate to pivot toward the bridging position. As embodied herein, the fourth step includes pivoting lever 40 from the first position in the forward direction causing center plate 24 to pivot from the rearward position in the forward direction and for causing lip plate 32 to pivot toward the bridging position. A four bar system formed by base plate 18, center plate 24, lip plate 32, and extension member 68 enables lip plate 32 to remain essentially parallel with loading dock platform 14 as center plate 24 pivots forwardly. This allows second edge 35 of lip plate 32 to clear the bed of the highest carrier in its service range, e.g., a carrier having a bed 5 inches above dock height. After the fourth step of the method of the present invention has been performed, the dock leveler is in the position shown in FIG. 6 (a) and the operating apparatus is in the position shown in FIG. 6 (b). Once the second edge 35 of lip plate 32 contacts carrier bed 16, the engagement between extension stop member 66 and extension member 68 is lost and dock leveler 10 will move into its bridging position, i.e., lip plate 32 will become essentially co-planar with center plate 24. The bridging position of dock leveler 10 is shown in FIG. 7.

The preferred embodiment of the method of the present invention further includes the step of permitting the extension member to disengage from the extension stop member when the center plate is at a predetermined pivotal position. This step is important when the dock leveler is operated at times when there is no carrier present. In such a case, it is desirable for the dock leveler to return to its stored position rather than remaining extended in a bridging position. As embodied herein, the engagement between extension stop member 66 and extension member 68 is lost when center plate 24 reaches a predetermined pivotal position and a carrier bed is not present. Extension member 68 slides along extension stop member 66 until it engages angled portion 74 (shown in FIG. 6(a)). When center plate 24 pivots forwardly from the position shown in FIG. 6(a), extension member 68 disengages from angled portion 74 in a sear action. Dock leveler 10 will then return to its stored position.

As is clear from the preceding description, cycling the leveler involves a four step operation. However, the process of recycling the leveler involves only a two-step operation. To recycle the dock leveler from the position shown in FIG. 7, lever 40 is moved in a rearward direction to the first position to pivot center plate 24 to its rearward position. During the rearward pivoting of center plate 24, lip plate 32 pivots via gravity to its retracted position in which acute angle 33 is formed between center plate 24 and lip plate 32. At this time, the dock leveler and operating apparatus of the present invention are in the position illustrated in FIGS. 3(a) and 3(b), respectively.

Figure 4A:
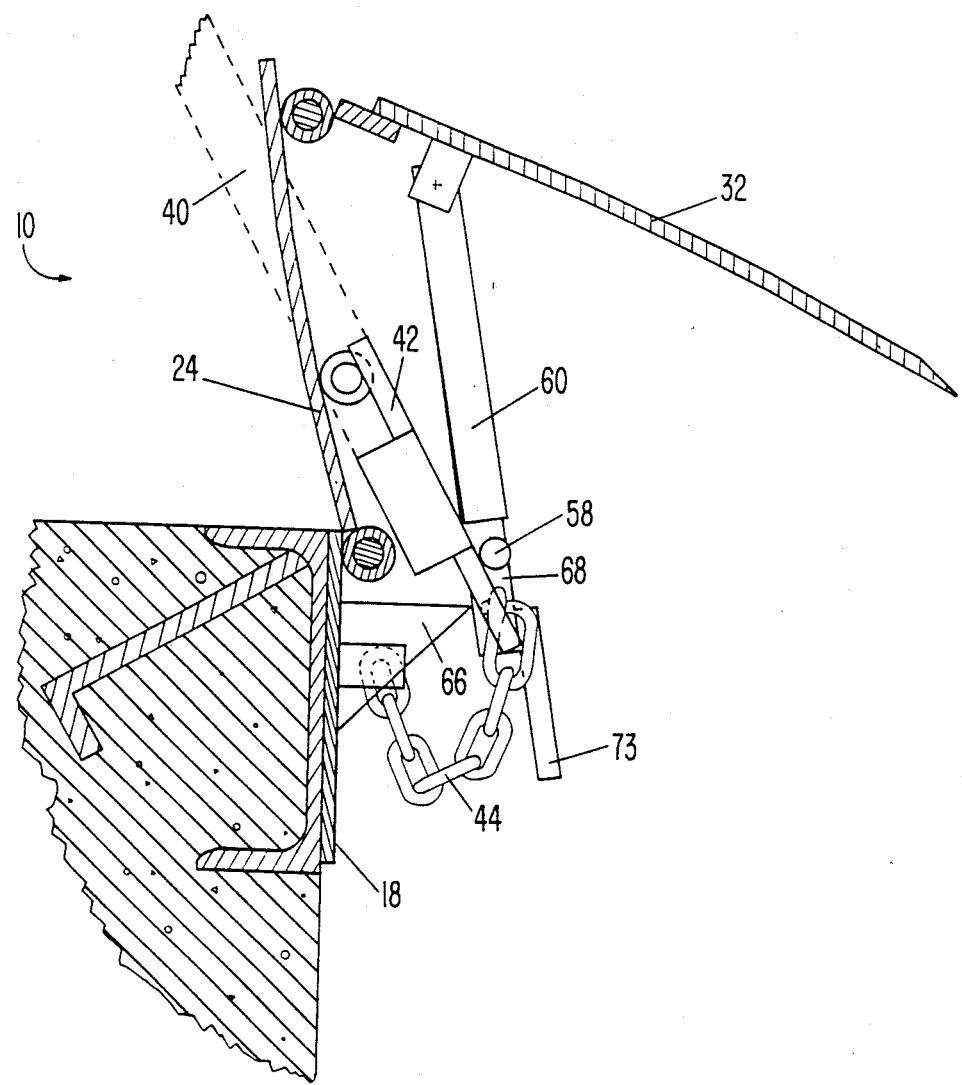
FIG. 4 (a) is a sectional side view illustrating the dock leveler shown in FIG. 1 when the lever has been forwardly pivoted from the position shown in FIG. 3 (a)

Lever 40 is then pivoted in a forward direction past the second position (shown in FIG. 4(a)) causing center plate 24 to pivot to its forward position wherein it is supported by support gussets 25. At no time during the forward pivoting of center plate 24 does the angle between center plate 24 and lip plate 32 exceed the substantially right angle 38 because extension member 68 is not engaged on extension stop member 66. Accordingly, dock leveler 10 can be recycled out of the highest truck in its service range without having to move the truck forward. An end load can then be placed on carrier bed 16.

It will be apparent to those skilled in the art that various modifications and variations can be made in the dock leveler of the present invention without departing from the scope or spirit of the present invention. Thus, it is intended that the present invention cover the modifications and variations of the invention which come within the scope of the appended claims or their equivalents.

What is claimed is:

1. A dock leveler for bridging a gap between a loading dock and a carrier bed comprising:
   a base plate to be attached to the loading dock;
   a center plate having first and second opposite edges, said first edge pivotably connected to said base plate for pivotal movement in rearward and forward directions between a full rearward position and a forward position;
   a lip plate having first and second opposite edges, the first edge of the lip plate pivotably connected to the second edge of the center plate for pivotal movement between a retracted position in which the lip plate forms an acute angle with the center plate, a stored position in which the lip plate forms a substantially right angle with the center plate and a bridging position in which the lip plate is substantially coplanar with and forms an extension of the center plate;
   lever means pivotably connected to the center plate, said lever means pivoting the center plate to the full rearward position upon movement in the rearward direction to a first position, the lip plate pivoting to the retracted position during the pivoting of the center plate to the full rearward position; and
   lip extension means for selectively pivoting the lip plate either toward the bridging position or to the stored position in response to forward movement of the lever means at times when the center plate is in the full rearward position, said forward movement of the lever means pivoting the center plate toward the forward position.

2. The dock leveler as recited in claim 1, wherein the lever means comprises an elongated member pivotably connected to the center plate, a manually operated lever and a connecting member having a first end connected to the base plate and a second end connected to the elongated member for limiting the pivotal movement of said lever and said elongated member.

3. The dock leveler as recited in claim 2, wherein the connecting member comprises a chain.

4. The dock leveler as recited in claim 2, wherein the connecting member comprises a U-shaped bar dimensioned to slidably receive the elongated member.

5. The dock leveler as recited in claim 2, wherein the connecting member comprises a closed loop and wherein the elongated member includes means slidably engaged in said loop.

6. The dock leveler as recited in claim 1, wherein the lip extension means includes an extension stop member disposed on the base plate and an extension member having a first end pivotably connected to the lip plate and a free second end, the free second end being engaged with the extension stop member at times when the lip plate is selected to pivot toward the bridging position.

7. The dock leveler as recited in claim 6, wherein the lip extension means includes cocking means attached to the lever means and the lip plate for engaging the free second end of the extension member on the extension stop member in response to a distinct movement of the lever means.

8. The dock leveler as recited in claim 7, wherein the cocking means includes a cocking stop member disposed on the lever means and a cocking arm having a first end pivotably connected to the lip plate and a free second end operative to engage the cocking stop member for engaging the free second end of the extension member on the extension stop member.

9. The dock leveler as recited in claim 8, wherein the engagement between the cocking arm and the cocking stop member causes the lip plate to pivot counterclockwise from the retracted position for raising the second edge of the lip plate relative to the loading dock.

10. The dock leveler as recited in claim 6, wherein the extension stop member includes an angled portion and the extension member disengages from said angled portion in a shear action when the center plate reaches a predetermined pivotal position.

11. An apparatus for operating a dock leveler having a base plate to be attached to a loading dock, a center plate pivotably connected to the base plate for pivotal movement in rearward and forward directions between a full rearward position and a forward position, and a lip plate pivotably connected to the center plate for pivotal movement between a retracted position in which the lip plate forms an acute angle with the center plate, a stored position in which the lip plate forms a substantially right angle with the center plate, and a bridging position in which the lip plate is substantially coplanar with and forms an extension of the center plate, the apparatus comprising:
    lever means adapted to be pivotably connected to the center plate for pivoting the center plate to the full rearward position upon movement in a rearward direction to a first position, the lip plate pivoting to the retracted position during the pivoting of the center plate to the full rearward position; and
    lip extension means adapted to be connected to the lip plate and base plate for selectively pivoting the lip plate either toward the bridging position or to the stored position in response to forward movement of the lever means at times when the center plate is in the full rearward position, said forward movement of the lever means pivoting the center plate toward the forward position.

12. The apparatus as recited in claim 11, wherein the lever means comprises an elongated member to be pivotably connected to the center plate, a manually operated lever and a connecting member having a first end to be connected to the base plate and a second end connected to the elongated member for limiting the pivotal movement of the lever and the elongated member.

13. The apparatus as recited in claim 12, wherein the connecting member comprises a chain.

14. The apparatus as recited in claim 12, wherein the connecting member comprises a U-shaped bar dimensioned to slidably receive the elongated member.

15. The apparatus as recited in claim 12, wherein the connecting member comprises a closed loop and wherein the elongated member includes means slidably engaged in said loop.

16. The apparatus as recited in claim 11, wherein the lip extension means includes an extension stop member to be disposed on the base plate and an extension member having a first end to be pivotally connected to the lip plate and a free second end, the free second end being engaged with the extension stop member at times when the lip plate is selected to pivot toward the bridging position.

17. The apparatus as recited in claim 16, wherein the lip extension means includes cocking means to be attached to the lever means and the lip plate for engaging the free second end of the extension member on the extension stop member in response to a distinct movement of the lever means.

18. The apparatus as recited in claim 17, wherein the cocking means includes a cocking stop member disposed on the lever means and a cocking arm having a first end to be pivotally connected to the lip plate and a free second end operative to engage the cocking stop member for engaging the free second end of the extension member on the extension stop member.

19. The dock leveler as recited in claim 18, wherein the engagement between the cocking arm and the cocking stop member causes the lip plate to pivot counterclockwise from the retracted position for raising the second edge of the lip plate relative to the loading dock.

20. The apparatus as recited in claim 16, wherein the extension stop member includes an angled portion and the extension member disengages from said angled portion in a sear action when the center plate reaches a predetermined pivotal position.

21. A dock leveler for bridging a gap between a loading dock and a carrier bed comprising:
    a base plate to be attached to the loading dock;
    a center plate having first and second opposite edges, said first edge pivotably connected to said base plate for pivotal movement in rearward and forward directions between a rearward position and a forward position;
    a lip plate having first and second opposite edges, the first edge of the lip plate pivotably connected to the second edge of the center plate for pivotal movement between a retracted position in which the lip plate forms an acute angle with the center plate, a stored position in which the lip plate forms a substantially right angle with the center plate, and a bridging position in which the lip plate is substantially coplanar with and forms an extension of the center plate;
    a manually operated lever;
    an operating tube for slidably receiving said lever;
    an elongated member having first and second spaced opposite ends, said operating tube being fixedly secured to the elongated member intermediate said first and second ends, said first end of said elongated member being pivotably connected to the center plate;
    a connecting member having first and second opposite ends, a first end being pivotably connected to the base plate and said second end being connected to the elongated member for limiting the pivotal movement of the lever and the elongated member, said elongated and connecting members operative to pivot the center plate to the rearward position upon movement of the lever in the rearward direction to a first position, the lip plate pivoting to the retracted position during the pivoting of the center plate to the rearward position;
    lip extension means for selectively pivoting the lip plate either toward the bridging position or to the stored position in response to forward movement of the lever at times when the center plate is in the rearward position, said forward movement of the lever pivoting the center plate toward the forward position, the lip extension means including an extension stop member disposed on the base plate and an extension member having a first end pivotably connected to the lip plate and a free second end, the free second end being engaged with the extension stop member at times when the lip plate is selected to pivot toward the bridging position;

cocking means including a cocking stop member disposed on the elongated member and a cocking arm, said cocking arm having a first end pivotally connected to the lip plate and a free second end operative to engage the cocking stop member for engaging the free second end of the extension member on the extension stop member in response to a distinct movement of the lever, the engagement between the cocking stop member and the second end of the cocking arm causing the lip plate to pivot counterclockwise from the retracted position for raising the second edge of the lip plate relative to the loading dock.

22. The dock leveler as recited in claim 21, wherein the extension stop member includes an angled portion and the extension member disengages from said angled portion in a sear action when the center plate reaches a predetermined pivotal position.

23. A method of operating a dock leveler, the dock leveler including a base plate to be attached to a loading dock, a center plate having first and second opposite edges with the first edge pivotally connected to the base plate for pivotal movement between a rearward and forward position, a lip plate having first and second opposite edges with the first edge pivotably connected to the second edge of the center plate for pivotal movement between a retracted position in which the lip plate forms an acute angle with the center plate, a stored position in which the lip plate forms a substantially right angle with the center plate, and a bridging position in which the lip plate is substantially coplanar with and forms an extension of the center plate, lever means pivotably connected to the center plate, and lip extension means including an extension stop member and an extension member, the lip extension means pivoting the lip plate toward the bridging position in response to forward movement of the lever means at times when the center plate is in the rearward position and the extension member is engaged on the extension stop member, the method comprising the steps of:

(a) rearwardly pivoting the lever means to a first position to cause the center plate to pivot to the rearward position while permitting the lip plate to pivot to the retracted position, (b) pivoting the lever means from the first position in the forward direction to a second position while maintaining the center plate in the rearward position;

(c) pivoting the lever means from the second position in the rearward direction to the first position while maintaining the center plate in the rearward position for engaging the extension member on the extension stop member, (d) pivoting the lever means from the first position in the forward direction causing the center plate to pivot from the rearward position in the forward direction and for causing the lip plate to pivot toward the bridging position.

24. The method as recited in claim 23, further comprising the step of permitting the extension member to disengage from the extension stop member when the center plate is at a predetermined pivotal position, the disengagement of the extension member from the extension stop member creating a sear action.

* * * * *

UNITED STATES PATENT AND TRADEMARK OFFICE
CERTIFICATE OF CORRECTION

PATENT NO. : 4,935,979

DATED : June 26, 1990

INVENTOR(S) : Walker et al.

It is certified that error appears in the above-identified patent and that said Letters Patent is hereby corrected as shown below:

Claim 10, column 11, line 11,

"shear" should be --sear--.

Signed and Sealed this

Sixth Day of August, 1991

Attest:

HARRY F. MANBECK, JR.

*Attesting Officer*

*Commissioner of Patents and Trademarks*